United States Patent
Jung et al.

(10) Patent No.: US 9,871,568 B2
(45) Date of Patent: Jan. 16, 2018

(54) SYSTEM DETECTION IN A HIGH FREQUENCY BAND RADIO ACCESS TECHNOLOGY ARCHITECTURE

(71) Applicant: Intel IP Corporation, Santa Clara, CA (US)

(72) Inventors: Hyejung Jung, Palatine, IL (US); Qinghua Li, San Ramon, CA (US); Pingping Zong, Randolph, NJ (US)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 14/671,840

(22) Filed: Mar. 27, 2015

(65) Prior Publication Data
US 2016/0044584 A1 Feb. 11, 2016

Related U.S. Application Data

(60) Provisional application No. 62/035,807, filed on Aug. 11, 2014.

(51) Int. Cl.
*H04B 7/06* (2006.01)
*H04W 48/14* (2009.01)
(Continued)

(52) U.S. Cl.
CPC .......... *H04B 7/0617* (2013.01); *H04W 48/14* (2013.01); *H04W 28/06* (2013.01); *H04W 84/045* (2013.01)

(58) Field of Classification Search
CPC .... H04B 7/0617; H04W 48/14; H04W 48/16; H04W 84/045; H04W 56/0015; H04W 74/0891
See application file for complete search history.

(56) References Cited

U.S. PATENT DOCUMENTS

2005/0085265 A1* 4/2005 Laroia ............... H04W 36/0072
455/560
2005/0141545 A1* 6/2005 Fein ..................... H04B 7/0617
370/445
(Continued)

FOREIGN PATENT DOCUMENTS

TW 104121862 10/2014
WO 2014109478 A1 7/2014

OTHER PUBLICATIONS

International Search Report and Written Opinion of corresponding PCT Application PCT/US15/36251 dated Sep. 30, 2015.
(Continued)

*Primary Examiner* — Derrick Ferris
*Assistant Examiner* — Kevin Lee
(74) *Attorney, Agent, or Firm* — Ledell Ansari, LLP

(57) ABSTRACT

Techniques are described herein for fast and efficient discovery of small cells by user equipment ("UE") in a wireless telecommunications network. The small cells may operate at a high frequency band ("HFB"), which may correspond to higher frequencies than other cells (e.g., base stations, such as evolved Node Bs ("eNBs")) of the network. The UE may receive assistance information, which may include polling channel configurations, beamforming weights, carrier frequencies, cell identifiers of small cells, and/or other information. The UE may use the assistance information when outputting (either omnidirectionally, pseudo-omnidirectionally, or directionally) a polling sequence, in order to detect the small cells.

20 Claims, 10 Drawing Sheets

(51) Int. Cl.
*H04W 28/06* (2009.01)
*H04W 84/04* (2009.01)

(56) References Cited

U.S. PATENT DOCUMENTS

| | | | |
|---|---|---|---|
| 2009/0051594 A1* | 2/2009 | Na | H04B 7/0854 |
| | | | 342/373 |
| 2009/0279474 A1* | 11/2009 | Chou | H04B 7/155 |
| | | | 370/315 |
| 2012/0329456 A1 | 12/2012 | Makh et al. | |
| 2014/0016488 A1 | 1/2014 | Xu et al. | |
| 2014/0038598 A1 | 2/2014 | Ren et al. | |
| 2015/0023191 A1* | 1/2015 | Kim | H04W 56/0015 |
| | | | 370/252 |
| 2015/0105067 A1* | 4/2015 | Valliappan | H04W 74/0808 |
| | | | 455/424 |
| 2015/0156671 A1* | 6/2015 | Kuchibhotla | H04L 1/1861 |
| | | | 370/330 |
| 2015/0311923 A1* | 10/2015 | Valliappan | H04W 16/14 |
| | | | 370/338 |
| 2015/0319700 A1* | 11/2015 | Oteri | H04W 52/10 |
| | | | 455/127.1 |
| 2015/0327201 A1* | 11/2015 | He | H04W 48/16 |
| | | | 370/336 |
| 2015/0373627 A1* | 12/2015 | Ryu | H04W 48/16 |
| | | | 455/434 |
| 2016/0278081 A1* | 9/2016 | Chun | H04W 74/08 |

OTHER PUBLICATIONS

Ericsson et al., "Small Cell Detection", R2-121417, 3GPP TSG-RAN WG2 #77bis, Jeju Island, Republic of Korea, Mar. 20, 2012 (http://www.3gpp.org//ftp/tsg_ran/WG2_RL2/TSGR2_77bis/docs/R2-121417.zip).

Nokia Siemens Networks et al., "Enhancements for Small Cell Detection", R2-120523, 3GPP TSG-RAN WG2 Meeting #77, Dresden, Germany, Jan. 31, 2012 (http://www.3gpp.org/ftp/tsg_ran/WG2_RL2/TSGR2_77/docs/R2-120523.zip).

3GPP TS 36.133 v12.6.0; "3rd Generation Partnership Project; Technical Specification Group Radio Access Network; Evolved Universal Terrestrial Radio Access (E-UTRA); Requirements for support for radio resource management (Release 12)", Dec. 2014 (available at http://nashville.dyndns.org:800/WirelessDownloads/standards/3GPP%20gsm-gprs-edge-umts-hspa-LTE/Latest%20LTE/36133-c60_cover.pdf).

* cited by examiner

SYSTEM DETECTION IN A HIGH FREQUENCY BAND RADIO ACCESS TECHNOLOGY ARCHITECTURE

RELATED APPLICATIONS

The present application claims the benefit of U.S. Provisional Patent Application No. 62/035,807, which was filed on Aug. 11, 2014, the contents of which are hereby incorporated by reference as though fully set forth herein.

BACKGROUND

As data-intensive services (such as music and movie streaming, three-dimensional content streaming, virtual reality experiences, etc.) become more and more a part of society, the demand for high-bandwidth, low-latency data transmission increases. Wireless networks, such as cellular telecommunications networks, may make use of various different radio access technologies ("RATs"), each of which may have different benefits and detriments. For example, a fifth generation ("5G") RAT may be a considered as a high frequency band ("HFB") RAT (e.g., may correspond to a higher frequency band than a fourth generation ("4G") RAT). The 5G RAT may provide higher levels of performance (e.g., lower latency and/or higher throughput) than the 4G RAT, but may have a smaller coverage area than the 4G RAT.

One potential solution to the above-mentioned detriment of HFB RATs is to deploy multiple HFB RAT "small cells," to provide enhanced coverage of the HFB RAT. In order to utilize the HFB RAT, user equipment (("UE") e.g., cellular telephones) typically needs to detect one or more small cells. Detection of the small cells can potentially be an inefficient process, in terms of UE power consumption, radio resource utilization, and/or latency.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

DETAILED DESCRIPTION OF PREFERRED EMBODIMENTS

Figure 1A:
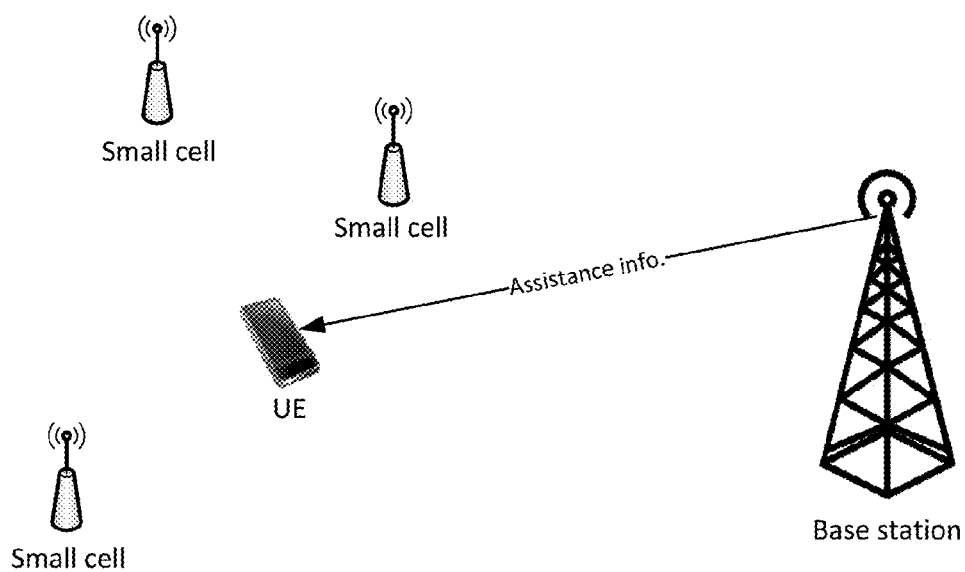
FIGS. 1A, 1B, and 2-4 conceptually illustrate an overview of one or more implementations described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

In one implementation, a UE apparatus may include: a radio component to connect to a wireless telecommunications network; a memory device storing a set of processor-executable instructions; and processing circuitry to execute the set of processor-executable instructions, wherein executing the set of processor-executable instructions causes the UE to: receive assistance information that includes at least one of: a carrier frequency and one or more cell identifiers associated with the wireless telecommunications network, a polling channel configuration, or a polling response channel configuration; generate, based on the assistance information, a polling signal; output the generated polling signal via the radio component; receive a synchronization signal in response to the polling signal, the synchronization signal being received via the radio component and from one or more cells of the wireless telecommunications network; and detect (and eventually connect to) a particular cell, of the one or more cells of the wireless telecommunications network, using information included in the synchronization signal.

The assistance information may include the carrier frequency associated with the wireless telecommunications network, and outputting the polling signal may include outputting the polling signal based on the carrier frequency. The assistance information includes the polling channel configuration, and outputting the polling signal may include outputting the polling signal according to the polling channel configuration. The polling response channel configuration may include an indication of at least one of: a time-frequency resource allocation, or a set of synchronization signal sequences. In some implementations, the UE may determine, based on a radio access technology via which the assistance information was received, one or more parameters associated with the polling signal. The one or more parameters, determined based on the radio access technology via which the assistance information was received, may include at least one of: a guard time duration associated with the polling signal, or a cyclic prefix duration associated with the polling signal.

In some implementations, assuming the radio component is a first radio component associated with a first radio access technology, and the UE further comprises a second radio component associated with a second radio access technology that is different from the first radio access technology, the assistance information may be received via the first radio component. In some implementations, the assistance information may be received via the second radio component.

In some implementations, outputting the polling signal may include outputting the polling signal in an omnidirectional, a pseudo-omnidirectional, or a directional pattern. The wireless telecommunications network may include one or more base stations that operate at a frequency band associated with a Long-Term Evolution standard, and one or more small cells that operate at a higher frequency band than the frequency band associated with the Long-Term Evolution standard, and the one or more base stations may be synchronized with the one or more small cells. In some implementations, the assistance information may include spatial information, and outputting the polling signal may include beamforming the polling signal based on the spatial information.

In some implementations, a transmit timing of the polling signal may be based on a timing of another wireless communication system. The transmit timing of the polling signal may be determined by applying a timing advance based on a timing of the other wireless communication system, and the timing advance may be determined based on a value provided by the other wireless communication system.

A set of transmit beamforming weights, associated with the received synchronization signal, may be based on a set of receive beamforming weights associated with the polling signal. The polling channel configuration may include at least one of: a selected polling channel format, a time-frequency resource allocation, parameters for transmit power control, or a preamble sequence. The parameters for transmit power control may include at least one of: an initial transmit power, an amount of power ramping, parameters related to set a configured maximum output power, or a required number of transmissions before transmitting with the maximum configured output power. The UE may sequentially transmit multiple polling sequences using multiple different antenna patterns, where a first polling sequence is separated from a second polling sequence by a guard time.

In another implementation, a cell device, of a wireless telecommunications network, may include: a radio component to communicate with a UE; a memory device storing a set of processor-executable instructions; and processing circuitry to execute the set of processor-executable instructions, wherein executing the set of processor-executable instructions causes the cell device to: output, to the UE, assistance information that may include at least one of: a carrier frequency associated with the wireless telecommunications network, a polling channel configuration, or a polling response channel configuration; receive, from the UE, a polling signal that was generated by the UE based on the assistance information; generate a synchronization signal for the UE, the generating including: determining one or more beamforming weights based on the received polling signal; and output the generated synchronization signal via a polling response channel, to the UE, in response to the polling signal, the polling response channel corresponding to the polling response channel configuration.

The cell device may operate at a higher frequency band than a frequency band at which an LTE base station network operates. The cell device may be synchronized with one or more LTE base stations. Assistance information may include the carrier frequency associated with the wireless telecommunications network, and the polling signal may be received at the carrier frequency associated with the wireless telecommunications network. The cell device may determine one or more transmission points from which to output the synchronization signal via the polling response channel, the determining being based on at least one of: a signal strength of the received polling signal, a signal power at which the received polling signal was transmitted by the UE, a receive timing offset of the received polling signal, or a load condition of the wireless telecommunications network. The assistance information further may include a cell identifier of the cell device. The beamforming weights may be determined based on at least one of: a beamforming weight associated with the received polling signal, or a set of beamforming weights. The polling channel configuration may include at least one of: a polling channel format, a time-frequency resource allocation, parameters for transmit power control, or a preamble sequence. The parameters for transmit power control may include: at least one of an initial transmit power, an amount of power ramping, parameters related to set a configured maximum output power, or a required number of transmissions before transmitting with the maximum configured output power.

In another implementation, a method may include receiving, by a wireless telecommunications network, a polling signal from a UE; and outputting, from a plurality of transmission points of the wireless telecommunications network, a plurality of synchronization signals to a plurality of UEs, where a first synchronization signal for a first UE, from a first transmission point, is associated with a first set of beamforming weights, where a second synchronization signal for the first UE, from a second transmission point, is associated with a second set of beamforming weights that is different from the first set of beamforming weights, where the first and second synchronization signals for the first UE are transmitted on a same time-frequency resource, and where outputting the plurality of synchronization signals includes multiplexing the plurality of synchronization signals associated with different analog beamforming weights on a frequency domain. The synchronization signals for the first UE, associated with a first set of analog beamforming weights, may be outputted from a particular transmission point on a first frequency sub-domain, and the synchronization signals for a second UE, associated with a second set of analog beamforming weights, may be outputted from another transmission point on a second frequency sub-domain, the first and second sub-domains being different.

The transmission points may operate at a higher frequency band than a frequency band at which a Long-Term Evolution base station operates. The first and second synchronization signals may be output simultaneously by the first and second transmission points, respectively.

In another implementation, a UE may include means for receiving assistance information that may include at least one of: a carrier frequency associated with a wireless telecommunications network, or a polling channel configuration; means for generating, based on the assistance information, a polling signal; means for outputting the generated polling signal; means for receiving a synchronization signal in response to the polling signal, the response being received from one or more cells of the wireless telecommunications network; and means for detecting to a particular cell, of the one or more cells of the wireless telecommunications network, using information included in the synchronization signal.

The assistance information may include the carrier frequency associated with the wireless telecommunications network, and outputting the polling signal may include outputting the polling signal at the carrier frequency. The assistance information may include the polling channel configuration, and outputting the polling signal may include outputting the polling signal according to the polling channel configuration. The polling channel configuration may include an indication of at least one of: a cyclic prefix duration, or a guard time duration. The UE may further include means for determining, based on a radio access technology via which the assistance information was received, one or more parameters associated with the polling signal.

The parameters, determined based on the radio access technology via which the assistance information was received, may include at least one of: a guard time duration associated with the polling signal, or a cyclic prefix duration associated with the polling signal. The UE may further include first radio means to connect to the wireless telecommunications network using a first radio access technology; and second radio means to connect to the wireless telecommunications network using a second radio access technology that is different from the first radio access technology, and the assistance information may be received via the first radio means. In some implementations, the assistance information may be received via the second radio means. The assistance information may include spatial information, and outputting the polling signal may include beamforming the polling signal based on the spatial information. A transmit timing of the polling signal may be based on a timing of another wireless communication system. The transmit timing of the polling signal may be determined by applying a timing advance based on the timing of the other wireless communication system, the timing advance being determined based on a value provided by the other wireless communication system.

A set of transmit beamforming weights, associated with the received synchronization signal, may be based on a set of receive beamforming weights associated with the polling signal. The polling channel configuration may include a selected polling channel format, a time-frequency resource allocation, parameters for transmit power control, and/or a preamble sequence. The parameters for transmit power control may include an initial transmit power, an amount of power ramping, parameters related to set a configured maximum output power, and/or a required number of transmissions before transmitting with the maximum configured output power. The UE may further include means for sequentially transmit multiple polling sequences using a plurality of different antenna patterns, where a first polling sequence is separated from a second polling sequence by a guard time.

In another implementation, a non-transitory computer-readable medium, storing a set of processor-executable instructions, which when executed by one or more processors of one or more devices, cause the one or more processors to: receive a polling signal from a user equipment UE; and output, from a plurality of transmission points of a wireless telecommunications network, a plurality of synchronization signals to a plurality of UEs, where a first synchronization signal for a first UE, from a first transmission point, is associated with a first set of beamforming weights, where a second synchronization signal for the first UE, from a second transmission point, is associated with a second set of beamforming weights that is different from the first set of beamforming weights, where the first and second synchronization signals for the first UE are transmitted on a same time-frequency resource, where outputting the plurality of synchronization signals includes: multiplexing the plurality of synchronization signals associated with different analog beamforming weights on a frequency domain, the synchronization signals for the first UE associated with a first set of analog beamforming weights being outputted from one transmission point on a first frequency sub-domain, and the synchronization signals for a second UE associated with a second set of analog beamforming weights being outputted from another transmission point on a second frequency sub-domain, the first and second sub-domains being different.

FIGS. 1A-4 illustrate an overview of an example implementation of small cell detection by a UE. For instance, as shown in FIG. 1A, a UE may be in the general vicinity of a set of wireless small cells and a base station. In some implementations, the base station may be, for example, an evolved Node B ("eNB") of a Long Term Evolution ("LTE") wireless telecommunications network, and the small cells may be microcells, femtocells, and/or other types of devices via which a UE may connect to the wireless telecommunications network. The base stations may thus be considered to be "macrocells" with respect to the small cells. The small cells may correspond to a different RAT than the base station. For instance, the small cells may correspond to an HFB RAT (e.g., a RAT that operates at a relatively higher frequency band than a frequency band at which the base station operates), and the base station may correspond to a low frequency band ("LFB") RAT (e.g., a RAT that operates at a relatively lower frequency band than a frequency band at which the small cells operate). Thus, the terms "HFB" and "LFB," as used herein, may be used in a relative manner, to indicate a higher or lower frequency band, respectively.

As shown in FIG. 1A, the UE may receive assistance information from the base station (e.g., via an established connection with the base station). The assistance information may include information that facilitates the detection of one or more of the small cells, by the UE. For example, as will be discussed further below, the assistance information may include carrier frequencies and cell identifiers of the small cells, polling channel configuration parameters (e.g., polling channel format, time-frequency resources, periodicity, parameters for transmit power control, etc.), a preamble sequence, and/or time-frequency resources for a polling response channel. The base station may send the assistance information upon an initial attachment with the base station, when the base station detects that the UE is near one or more small cells, when the base station receives a request from the UE for the assistance information, and/or based on one or more other events.

Figure 1B:
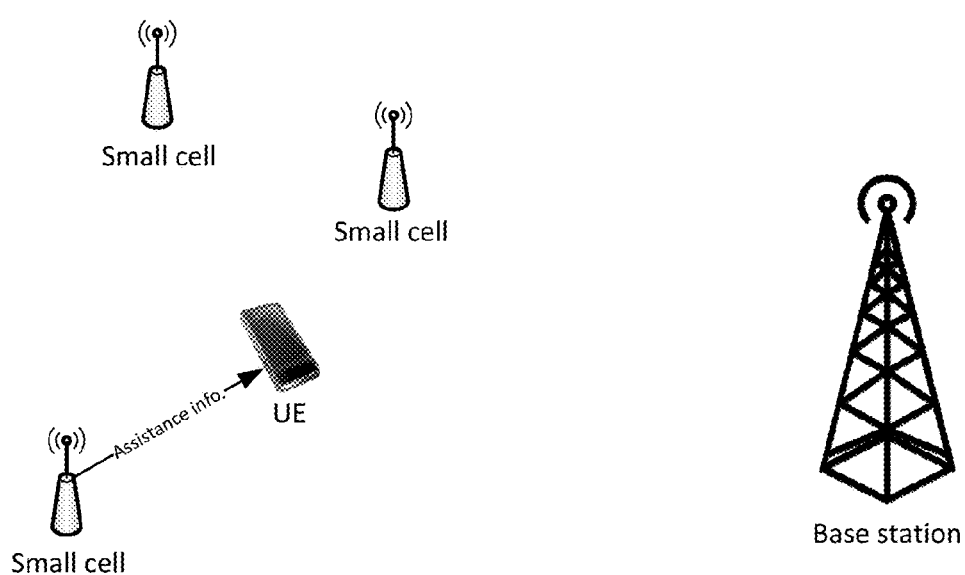

Additionally, or alternatively, as shown in FIG. 1B, the UE may receive assistance information from a small cell. This may occur when, for example, the UE is presently attached to the small cell from which the assistance information is received.

Figure 2:
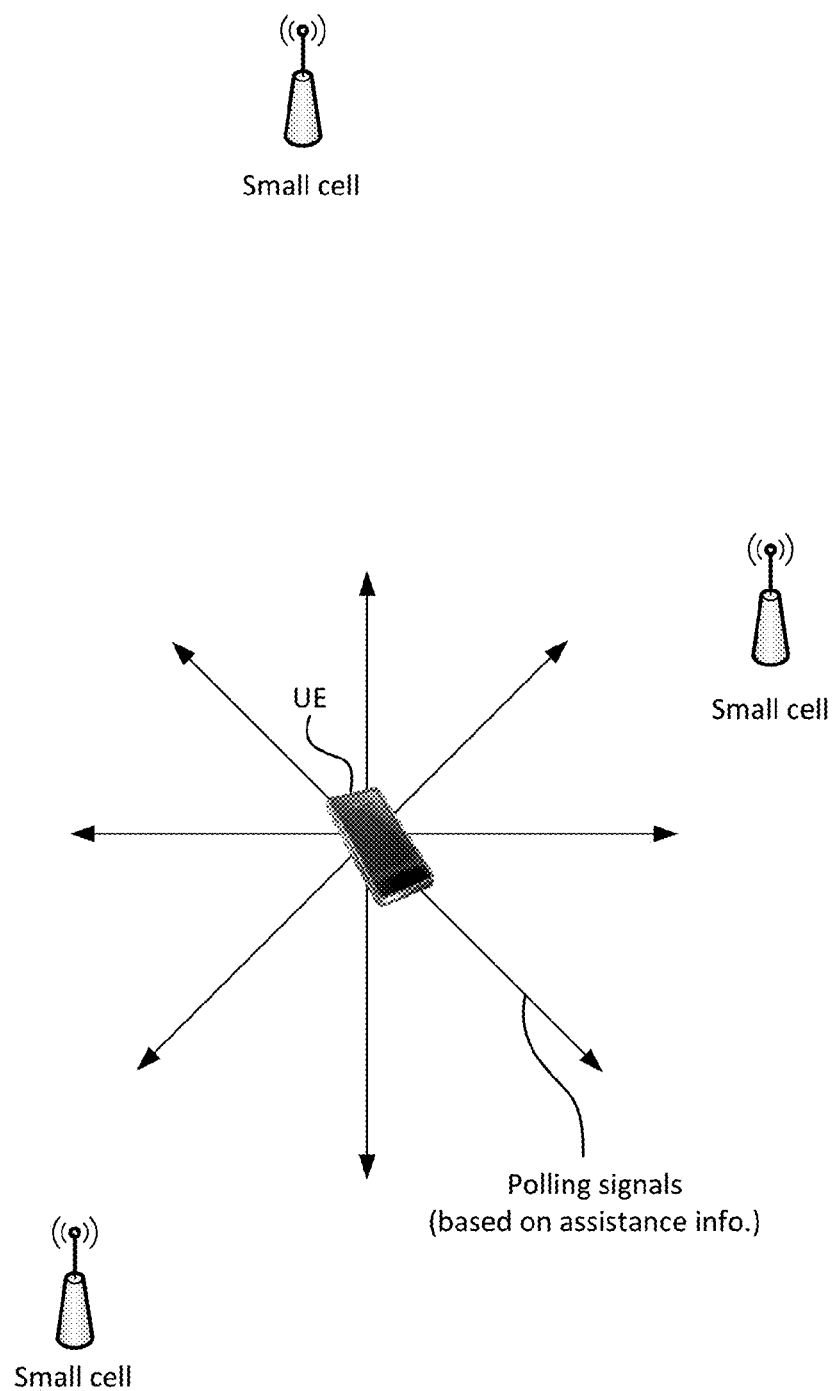

As shown in FIG. 2, the UE may output polling signals, in order to detect small cells that are in range of the UE. The polling signals may be generated based on the assistance information (provided in FIGS. 1A and/or 1B). For instance, as further described below, the polling signals may include a preamble sequence that is specified in the assistance information, may be transmitted at frequency bands specified in the assistance information, etc. Additionally, or alternatively, and also as described below, the UE may use particular time-frequency resources, as specified in the assistance information, when outputting the polling signals. In some implementations, the timing of the transmission of the polling signals, outputted by the UE, may be based on the assistance information.

In some implementations, the UE may output the polling signals in an omni-directional fashion. In some implementations, the UE may output the polling signals in a different fashion, such as a pseudo-omnidirectional fashion, and/or a limited directional fashion. For instance, in some implementations, the assistance information may specify a direction in which the UE should output the polling signals, and/or may specify a location of one or more microcells (based on which the UE may determine the directionality of the polling signals).

Figure 3:
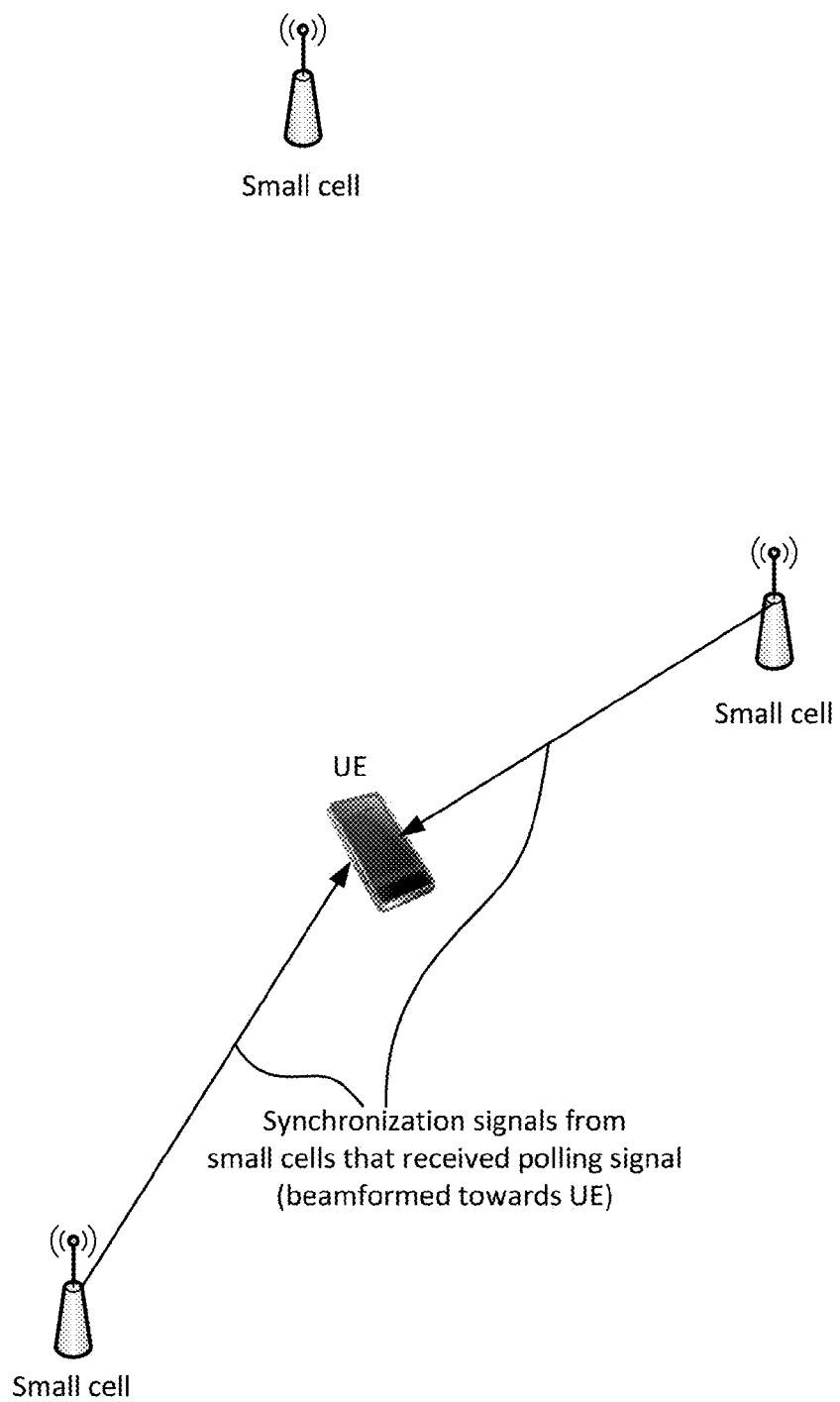
Figure 4:
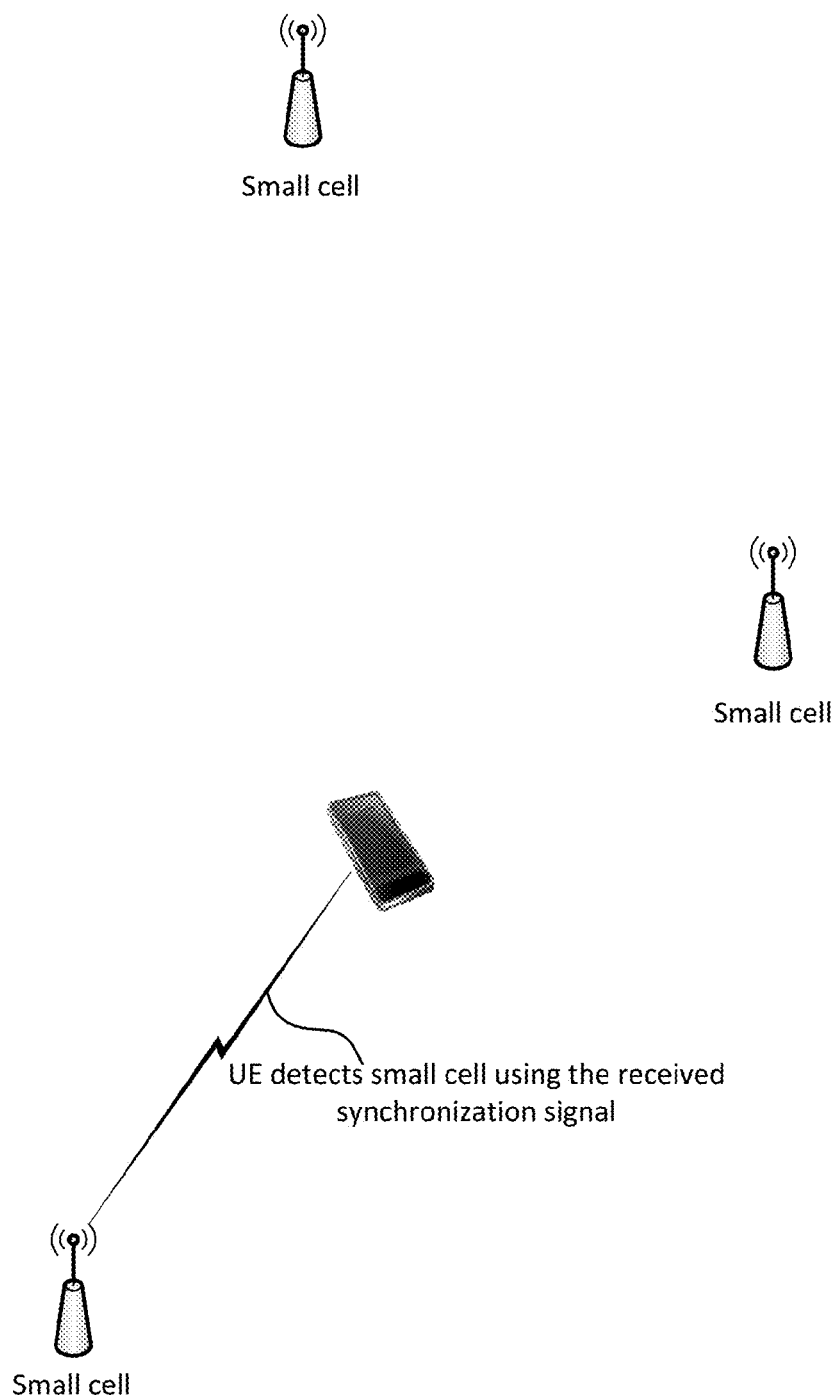

Referring to FIG. 3, assume two of the three illustrated small cells received a polling signal from the UE. As illustrated, these two small cells may provide synchronization signals to the UE. The synchronization signal, from a particular small cell, may be beamformed in a direction toward the UE. The small cells may determine the direction in which to beamform the synchronization signals based on the polling signals received from the UE. As shown in FIG. 4, the UE may detect a particular small cell (e.g., may acquire timing and frequency synchronization, a UE receive/transmit beam direction, a cell identifier, etc.), using the received synchronization signal.

Figure 5:
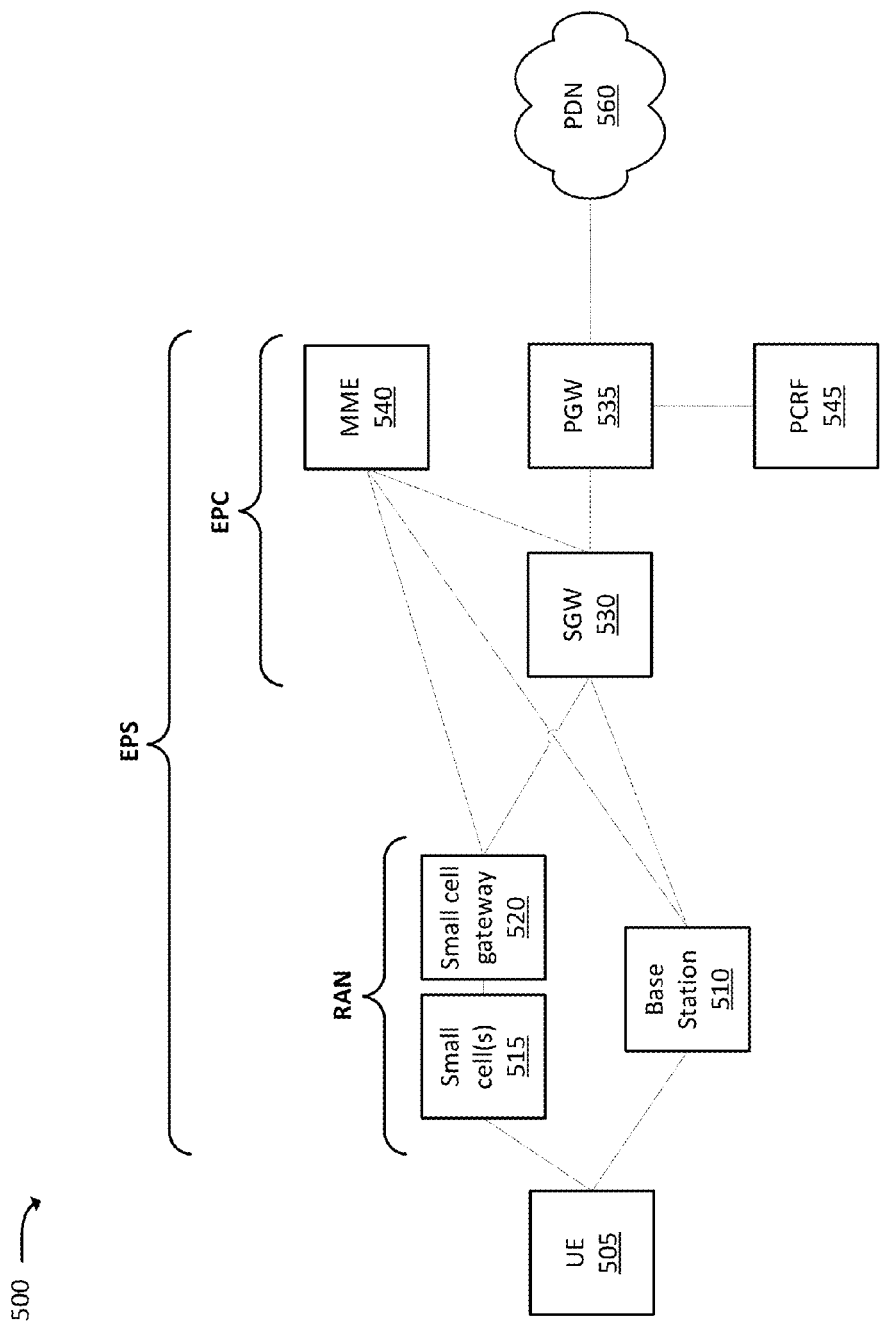
FIG. 5 is a diagram of an example environment in which systems and/or methods described herein may be implemented.

FIG. 5 illustrates an example environment 500, in which systems and/or methods described herein may be implemented. As shown in FIG. 5, environment 500 may include UE 505, base station 510, small cell 515, small cell gateway 520, serving gateway ("SGW") 530, packet data network ("PDN") gateway ("PGW") 535, mobility management entity device ("MME") 540, policy and charging rules function ("PCRF") 545, and PDN 560.

Environment 500 may include an evolved packet system ("EPS") that includes an LTE network and/or an evolved packet core ("EPC") network that operate based on a third generation partnership project ("3GPP") wireless communication standard. The LTE network may be a part of, or may include, a radio access network ("RAN") that includes one or more base stations 510, some or all of which may take the form of an eNB, via which UE 505 may communicate with the EPC network. As shown, the RAN may also include one or more small cells 515, which may operate at a different RAT than base station 510. For instance, small cells 515 may operate at an HFB RAT, while base station 510 may operate at an LFB RAT. The EPC network may include one or more SGWs 530, PGWs 535, and/or MMEs 540, and may enable UE 505 to communicate with PDN 560 and/or an Internet protocol ("IP") multimedia subsystem ("IMS") core network (not pictured). The IMS core network may include Home Subscriber Server ("HSS"), an Authentication, Authorization, and Accounting ("AAA") server, a Call Session Control Function ("CSCF"), and/or one or more other devices. The IMS core network may manage authentication, session initiation, account information, a user profile, etc., associated with UE 505.

UE 505 may include a computation and communication device, such as a wireless mobile communication device that is capable of communicating with base station 510, small cell 515, and/or PDN 560. For example, UE 505 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. UE 505 may send traffic to and/or receive traffic from PDN 560 via base station 510, small cell 515, small cell gateway 520, SGW 530, and/or PGW 535.

Base station 510 may include one or more network devices that receive, process, and/or transmit traffic, such as calls, audio, video, text, and/or other data, destined for and/or received from UE 505. In one example, base station 510 may be an eNB device and may be part of the LTE network. Base station 510 may receive traffic from and/or send traffic to UE 505 via SGW 530, PGW 535, and/or PDN 560. Base station 510 may send traffic to and/or receive traffic from UE 505 via, for example, an air interface (e.g., a cellular air interface).

As mentioned above, base station 510 may operate at an LFB RAT (e.g., a RAT that corresponds to a lower frequency band than an HFB RAT associated with small cells 515). For instance, base station 510 may operate at one or more frequency bands that correspond to an LTE RAT, a 3GPP third generation ("3G") RAT, a 3GPP second generation ("2G") RAT, a Code Division Multiple Access 2000 ("CDMA2000") 1×RAT, etc. Base station 510 may thus be considered a "macrocell," while small cells 515 may be considered as "microcells."

Small cell 515 may also include one or more network devices that receive process, and/or transmit traffic, such as calls, audio, video, text, and/or other data, destined for and/or received from UE 505. In one example, small cell 515 may include a portable device that may be deployed (e.g., physically placed and/or installed) by an end user (e.g., an individual or business that is separate from an entity that owns and/or operates base station 510). Additionally, or alternatively, small cell 515 may be deployed by an owner and/or an operator of base station 510. For instance, in some implementations, a particular small cell 515 may be co-located with base station 510. Small cell 515 may be directly communicatively coupled to MME 540, and/or maybe indirectly coupled to SGW 530 and/or MME 540 (e.g., via small cell gateway 520). Small cell 515 (and/or small cell gateway 520) may, in some implementations, be communicatively coupled to SGW 530 and/or MME 540 via PDN 560.

Small cell 515 may generally provide enhanced connectivity to the RAN (e.g., may provide higher data rate with wider bandwidth and/or lower latency than base station 510), than is provided by base station 510. The enhanced connectivity may be a result of the higher frequency band at which small cell 515 operates. For example, in some implementations, at a 6 gigahertz ("GHz") or higher frequency band. In 3GPP terminology, a small cell may sometimes be referred to as a Home Node B ("HNB") or a Home eNB ("HeNB").

Small cell gateway 520 may include one or more network devices, via which one or more small cells 515 may be communicatively coupled to MME 540 and/or to SGW 530. For example, small cell gateway 520 may include one set of interfaces to communicate with SGW 530 and/or MME 540, and another set of interfaces (e.g., interfaces of a different type) to communicate with one or more small cells 515. Small cell gateway 520 may aggregate control information (e.g., identifiers of small cells 515 to which UEs 505 are connected, identifiers of UEs 505 that are connected to small cells 515, handover/hand-in/hand-out instructions, etc.) from multiple small cells 515, and may report the information to MME 540. Additionally, or alternatively, small cell gateway 520 may aggregate user plane data (e.g., substantive traffic, such as call traffic, audio/video streaming traffic, web traffic, etc.) to and/or from multiple small cells 515. In some implementations, small cell 515 may communicate with MME 540 without an intervening small cell gateway 520.

SGW 530 may include one or more network devices that gather, process, search, store, and/or provide information in a manner described herein. SGW 530 may, for example, aggregate traffic received from one or more base stations 510, small cells 515, and/or small cell gateways 520, and may send the aggregated traffic to PDN 560 via PGW 535.

PGW 535 may include one or more network devices that gather, process, search, store, and/or provide information in a manner described herein. PGW 535 may aggregate traffic received from one or more SGWs 530, etc. and may send the aggregated traffic to PDN 560. PGW 535 may also, or alternatively, receive traffic from PDN 560 and may send the traffic toward UE 505 via base station 510, small cell 515, small cell gateway 520, and/or SGW 530.

MME 540 may include one or more computation and communication devices that perform operations to register UE 505 with the EPS, to establish bearer channels associated with a session with UE 505, to hand off UE 505 from the EPS to another network, to hand off UE 505 from the other network to the EPS, and/or to perform other operations. MME 540 may perform policing operations on traffic destined for and/or received from UE 505.

PCRF 545 may include one or more devices that aggregate information to and from the EPC network and/or other sources. PCRF 545 may receive information regarding policies and/or subscriptions from one or more sources, such as subscriber databases and/or from one or more users (such as, for example, an administrator associated with PCRF 545).

PDN 560 may include one or more wired and/or wireless networks. For example, PDN 560 may include an Internet Protocol ("IP")-based PDN, a wide area network ("WAN") such as the Internet, a core network of a telecommunications provider, a private enterprise network, and/or one or more other networks. UE 505 may connect, through PGW 535, to data servers, application servers, other UEs 505, and/or to other servers or applications that are coupled to PDN 560. PDN 560 may be connected to one or more other networks, such as a public switched telephone network ("PSTN"), a public land mobile network ("PLMN"), and/or another network. While "direct" connections are shown in FIG. 5 between certain devices, some devices may communicate with each other via PDN 560 (and/or another network).

Figure 6:
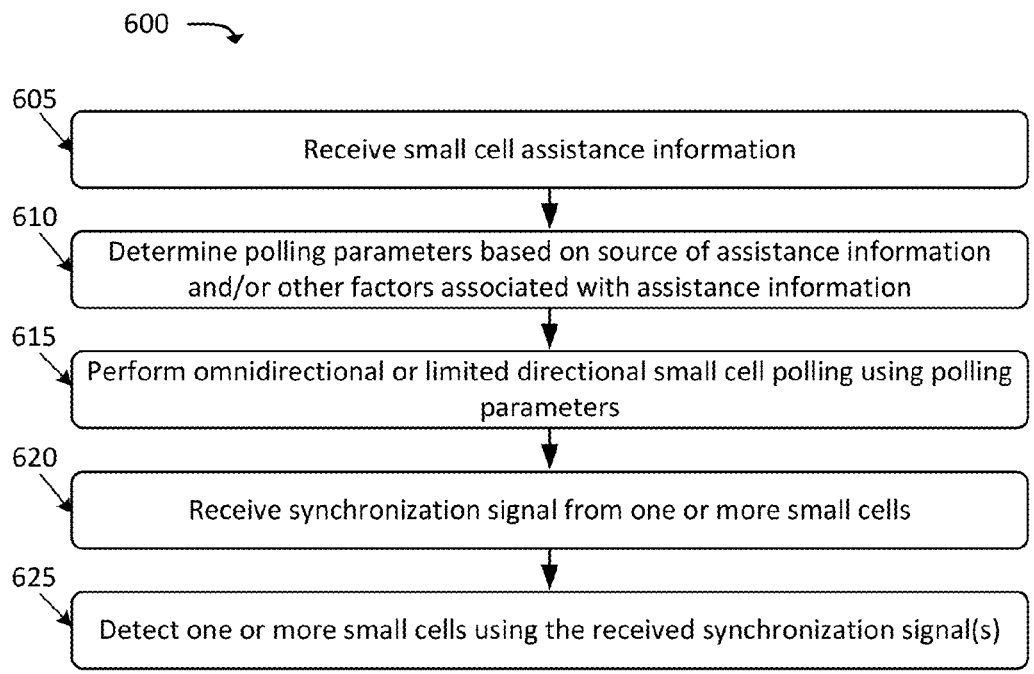
FIG. 6 illustrates an example process for detecting one or more small cells, in accordance with one or more implementations described herein.

FIG. 6 illustrates an example process 600 for attachment, by UE 505, to a particular small cell 515. In some implementations, process 600 may be performed by UE 505.

As shown, process 600 may include receiving (at 605) small cell assistance information. For example, as mentioned above with respect to FIGS. 1A and 1B, UE 505 may receive small cell assistance information from base station 510 (e.g., an eNB). If UE 505 is already attached to a particular small cell 515, UE 505 may receive the assistance information from base station 510 and/or the particular small cell 515. The assistance information may include information, based on which UE 505 can detect one or more small cells 515.

For instance, the assistance information may include cell identifiers and/or carrier frequencies associated with one or more small cells 515. As described below, the carrier frequency information may be used by UE 505 when outputting a polling sequence. In some implementations, the assistance information may indicate time-frequency resources allocated to UE 505, via which UE 505 receives one or more polling response channels, including synchronization signals. For example, as described in greater detail below, small cells 515 may efficiently allocate time-frequency resources, in order to maximize the number of UEs 505 that can receive synchronization signals and potentially connect to small cell 515. The time-frequency resources may include, for example, a slot number, an OFDM symbol number, a starting physical resource block ("PRB") number, etc.

As another example, the assistance information may include a UE polling channel format (e.g., as described below), a periodicity, and/or parameters for transmit power. The transmit power parameters may include, for instance, an initial transmit power, an amount of power ramping, a maximum output power, a quantity of transmissions before transmitting at the maximum power, etc. In some implementations, the assistance information may include a preamble sequence, which UE 505 may use when outputting the polling sequence (which may provide for contention-free transmission).

Process 600 may also include determining (at 610) polling parameters based on the source of the assistance information, and/or based on other factors associated with the assistance information. For example, UE 505 may determine polling parameters based on whether the assistance information was received via an HFB RAT (e.g., from small cell 515) or an LFB RAT (e.g., from base station 510). Specifically, for instance, a cyclic prefix ("CP") duration ("$T_{CP}$"), of a polling signal, may differ based on whether the assistance information was received via the HFB RAT or via the LFB RAT. In some implementations, when the assistance information is received via the LFB RAT, $T_{CP}$ may be a longer duration than if the assistance information is received via the HFB RAT. The different $T_{CP}$ may help account for the respective potential timing errors associated with the different RATs.

The following relates to an example timing relationship between an LFB RAT (e.g., an LTE RAT) and an HFB RAT. Assume that an initial transmit timing of a UE polling channel is determined by applying an LTE uplink ("UL") timing advance value to an LTE downlink ("UL") received timing. In LTE, a fixed timing offset between UL/DL frame timing, $T_{offset}$, may be set to zero for frequency division duplex ("FDD") and set to $624 \cdot T_s (=20.312 \ \mu s)$ for time division duplex ("TDD"). The estimated LTE DL receive frame timing with respect to the transmit frame timing at the LTE eNB is given by Equation 1:

$$t_{DL} = T_P + \epsilon_{UE,1}, \qquad \text{(Equation 1)}$$

where $T_P$ is a propagation delay between the LTE eNB and the UE, and $\epsilon_{UE,1}$ is a DL timing estimation error at the UE.

The physical random access channel ("PRACH") transmit timing with respect to an LTE eNB's transmit timing may be given by Equation 2:

$$t_{PRACH,tx} = t_{DL} - T_{offset} + \epsilon_{UE,2}, \qquad \text{(Equation 2)}$$

where $\epsilon_{UE,2}$ is an initial UE transmit timing error, and should be less than $\pm 12 \cdot T_s (=0.39 \ \mu s)$, according to some 3GPP standards (see, e.g., 3GPP Technical Specification ("TS") 36.133 version 12.6.0, "Technical Specification Group Radio Access Network; Evolved Universal Terrestrial Radio Access (E-UTRA); Requirements for support of radio resource management (Release 12)").

The estimated PRACH receive timing with respect to an LTE eNB's transmit timing may be given by Equation 3:

$$t_{PRACH,rx} = t_{PRACH,tx} + T_P + \epsilon_{eNB} = 2 \cdot T_P + \epsilon_{UE,1} + \epsilon_{UE,2} + \epsilon_{eNB} - T_{offset}, \qquad \text{(Equation 3)}$$

where $\epsilon_{eNB}$ is an timing estimation error at the LTE eNB.

Hence, the uplink timing advance for transmission to the LTE eNB may be given by Equation 4:

$$T_{TA} = t_{PRACH,rx} + T_{offset} = 2 \cdot T_P + \epsilon_{UE,1} + \epsilon_{UE,2} + \epsilon_{eNB} \qquad \text{(Equation 4)}$$

When UE applying the TA value above to the reference timing $t_{DL} - T_{offset}$, the physical uplink shared channel ("PUSCH") receive timing at the LTE eNB with respect to an LTE eNB's transmit timing may be given by Equation 5:

$$t_{PUSCH} = t_{DL} - T'_{offset} - T_{TA} + \epsilon_{UE,3} + T_p = -T_{offset} + \epsilon_{UE,3} - \epsilon_{UE,2} - \epsilon_{eNB},$$ (Equation 5)

where $\epsilon_{UE,3}$ is the PUSCH transmit timing error at the UE.

The following information relates to timing in the HFB RAT. Similar to LTE TDD cell phase synchronization requirement (e.g., according to 3GPP TS 36.133), the relative frame start timing error of the small cell eNB with respect to LTE subframe start timing at the LTE eNB, $t_o$, may be assumed to be less than or equal to ±3 μs.

The initial UE transmit timing in the HFB with respect to the transmit timing at the small cell may be given by Equation 6:

$$t_{UE-polling,tx} = t_{DL} - T_{TA}/2 - T'_{offset} - t_o = (\epsilon_{UE,1} - \epsilon_{UE,2} - eNB)/2 - T'_{offset} - t_o,$$ (Equation 6)

where T'$_{offset}$ is the fixed timing offset between UL/DL frame timing in the high frequency band.

The estimated UE polling signal receive timing with respect a small cell's transmit timing may be given by Equation 7:

$$t_{UE-polling,rx} = (\epsilon_{UE,1} - \epsilon_{UE,2} - \epsilon_{eNB})/2 - T'_{offset} - t_o + T'_p + \epsilon'_{UE} + \epsilon'_{eNB},$$ (Equation 7)

where T'$_p$ is a propagation delay from the UE to the small cell eNB, $\epsilon'_{UE}$ is an initial UE transmit timing error in the HFB, and $\epsilon'_{eNB}$ is a timing estimation error at the small cell eNB.

The uplink timing advance required for transmission to the small cell eNB is upper-bounded, as shown in Equation 8:

$$T'_{TA} = t_{UE-polling,rx} - (-T'_{offset}) =$$
$$T'_p + \frac{\varepsilon_{UE,1} - \varepsilon_{UE,2} - \varepsilon_{eNB}}{2} + \varepsilon'_{UE} + \varepsilon'_{eNB} - t_o \leq$$
$$T'_p + \frac{|\varepsilon_{UE,1}| + |\varepsilon_{UE,2}| + |\varepsilon_{eNB}|}{2} + |\varepsilon'_{UE}| + |\varepsilon'_{eNB}| + |t_o| \leq$$
$$T'_p + \frac{1 + 0.39 + 1}{2} + 0.01 + 0.01 + 3(\mu s) =$$
$$T'_p + 4.215(\mu s),$$ (Equation 8)

where DL and UL timing estimation errors in LTE are assumed to be upper-bounded to 1 μs, and UL transmit timing error and UL timing estimation error in the HFB RAT are assumed to be upper-bounded to 10 ns. The range of timing offset observed at the small cell may be given by Equation 9:

$$T'_{p,min} - \frac{|\varepsilon_{UE,1}| + |\varepsilon_{UE,2}| + |\varepsilon_{eNB}|}{2} - |\varepsilon'_{UE}| - |\varepsilon'_{eNB}| < t_{e,eNB} + t_o \leq$$
$$T'_{p,max} + \frac{|\varepsilon_{UE,1}| + |\varepsilon_{UE,2}| + |\varepsilon_{eNB}|}{2} + |\varepsilon'_{UE}| - |\varepsilon'_{eNB}|$$ (Equation 9)

For example, if $t_o = 3$ μs and the small cell radius is 200 m, then the timing offset of the received polling signal may be given such that $1.785 < t_{e,eNB} \leq 4.882$ (μs).

The PUSCH receive timing at the small cell with respect to the transmit timing at the small cell eNB may be given by Equation 10:

$$t'_{PUSCH} = t_{UE-polling,tx} - T'_{TA} + T'_p = -(\epsilon'_{UE} + \epsilon'_{eNB}) - T'_{offset}$$ (Equation 10)

Table 1, below, provides example parameters for an HFB small cell, in accordance with some implementations.

TABLE 1

| Parameters | Values |
|---|---|
| System bandwidth | 2 GHz |
| Fast Fourier Transform ("FFT") size | 2048 |
| Subcarrier frequency spacing | 1.5 MHz |
| OFDM/Single carrier frequency division multiple access ("SC-FDMA") sample rate | 3072 MHz |
| Sampling time $T_s$ | 0.32552 ns |
| Total number of subcarriers in data channel | 1200 |
| Inverse Discrete Fourier transform ("IDFT")/DFT period in data channel | 666.7 ns (=2048$T_s$) |
| CP duration for an OFDM/SC-FDMA symbol in data channel | 54.04 ns (=166$T_s$) for OFDM symbol 0<br>47.53 ns (=146$T_s$) for OFDM symbol 1-69 |
| Number of OMDM/SC-FDMA symbols per slot | 70 |
| Slot duration | 50 μs |
| Subframe duration | 100 μs |
| Frame duration $T_f$ | 1 ms (=3072000$T_s$) |
| Resource block ("RB") | 12 subcarriers with 1 slot duration |

Table 2, below provides example polling channel parameters for HFB small cells.

TABLE 2

| Parameters | Values |
|---|---|
| Polling channel duration | Format 1: 46.845 μs (~66 data symbols duration, <1 slot)<br>Format 2: 29.984 μs (~42 data symbols duration) |
| Sequence duration | 8 us (=24576 · $T_s$) |
| CP length | Format 1: 5.699 μs (=17506 · $T_s$)<br>Format 2: 1.483 μs (=4557 · $T_s$) |
| Guard time | $GT_1$: 0.100 us (=308 · $T_s$)<br>Format 1, $GT_2$: 5.549 μs (=17045 · $T_s$)<br>Format 2, $GT_2$: 1.333 μs (=4096 · $T_s$) |
| Subcarrier spacing | 125 KHz |
| Polling channel bandwidth | 104.875 MHz (=839 · Δf) |

In some implementations, when LFB (e.g., LTE) timing information is used, the cyclic prefix duration $T_{CP}$ may be equal to the sum of the maximum round trip delay, the maximum delay spread, and the total maximum allowed timing error in LTE and high frequency band (e.g., 4.215 μs). For a 200 m cell radius, $T_{CP}$ may be equal to 1.333 μs+0.150 μs+4.215 μs=5.698 μs.

For a given timing offset between LTE eNB and HFB small cell (within ±3 μs), the relative receive timing offset among different UEs' polling signals may be within ±3.097 μs (see Equation 9). Thus, the CP length of 5.698 μs ensures to keep the orthogonality among different UEs' polling channels at the small cell receiver.

A guard time duration $T_{GT,1}$ between polling signals of different sectors, which provides time budget for antenna sector switching (e.g., 100 ns), may be used. A guard time duration $T_{GT,2}$, at the end of concatenated polling signals, may be equal to the sum of the maximum round trip delay, the total maximum allowed timing estimation error in LTE and high frequency band (e.g., 4.215 μs). In summary, for a 200 m cell radius, $T_{CP}=17506 \cdot T_s=5.699$ μs, $T_{GT,1}=308 \cdot T_s=100.3$ ns, and $T_{GT,2}=17045 \cdot T_s=5.549$ μs.

In situations where the UE has already been connected to the HFB small cell, potential timing errors in the HFB RAT may be considered negligible compared to the maximum round trip delay. In these situations, the cyclic prefix duration $T_{CP}$ may be equal to the sum of the maximum round trip delay and a maximum delay spread (e.g., 150 ns), and the guard time duration $T_{GT,2}$, at the end of concatenated polling signals, may be equal to the maximum round trip delay. In summary, for 200 m cell radius, $T_{CP}=4557 \cdot T_s=1.483$ μs, $T_{GT,1}=308 \cdot T_s=100.3$ ns, and $T_{GT,2}=4096 \cdot T_s=1.333$ μs.

Process 600 may further include performing (at 615) omnidirectional or limited directional small cell polling using the polling parameters. For instance, UE 505 may output one or more polling signals, in order to locate one or more small cells 515. The polling signals may be based on the factors mentioned above, such as by including information indicated in the assistance information, may be formed in a direction (or directions) indicated in the assistance information, may be formed in a direction (or directions) based on locations of small cells 515, may be in a format indicated in the assistance information, may be in a format determined based on the source of the assistance information, etc. Examples of different formats of polling signals are described in more detail below.

In some implementations, UE 505 may output the polling signal(s) in an omnidirectional fashion (e.g., an equivalent, or nearly equivalent, strength signal in 360 degrees on a two-dimensional plane and/or in a three-dimensional space), a pseudo-omnidirectional fashion (e.g., an arc that is less than 360 degrees, such as a 120-degree arc), or a directional fashion. In some implementations, the directionality of the polling signals, outputted by UE 505, may be determined based on information included in the assistance information.

When transmitting the polling signals, UE 505 may use a Timing Advance value, in order to synchronize the timing of UE 505 with the timing of small cell 515. In some implementations, the assistance information may include a Timing Advance value, which may be (or may be completely or partially derived from) the propagation delay between base station 510 and UE 505. In some implementations, this propagation delay may be measured or estimated. For instance, in some implementations, the timing offset ($T_1$) of the received polling signal at small cell 515, with respect to the transmit timing of base station 510, may be based on the propagation delay between base station 510 and UE 505 ($T_2$) and the propagation delay between small cell 515 and UE 505 ($T_3$). In some implementations, the transmit timing of the polling signal at UE 505 may be the same as the UE 505 receive timing from base station 510, and, accordingly, $T_1$ may be equal to the sum of $T_2$ and $T_3$. To improve the polling signal detection performance at small cell 515, base station 510 may provide small cell 515 with an estimated value of $T_2$. One or more of these timing offsets may be calculated by base station 510, and/or some other device or entity, and may be provided to small cell 515.

As another example, the timing advance used by UE 505 may be based on one or more other values. For instance, in some implementations, the timing advance may be based on the round trip delay between base station 510 and UE 505 (e.g., may be equal to the round trip delay, may be equal to one half of the round trip delay, etc.). In situations where UE 505 has already connected to a particular small cell 515, UE 505 may apply a timing advance that is based on the propagation delay (either one way or round trip) between UE 505 and small cell 515.

In contrast to LTE PRACH transmission, the UE polling signal may be transmitted to multiple candidate serving cells before reception of any DL signal in the HFB RAT and, accordingly, a DL pathloss estimate for a particular small cell may not be available when UE 505 transmits the polling signal. Thus, an initial transmit power and an amount of power ramping may be configured by the network as a part of dedicated higher-layer assistance information via the LTE interface. The network may determine the initial transmit power and the amount of power ramping for UE 505, based on knowledge of a network deployment (e.g., co-located or non-co-located deployment of LTE and HFB RAT), a UE transmit power status (power-limited or not) and an approximate UE location which can be obtained via the LTE interface, and/or multi-user scheduling information on polling resource. If UE 505 does not receive a polling response from any candidate small cell after a configured number of transmissions of the polling signal, UE 505 may transmit with the configured maximum transmit power.

Based on the received polling signal, small cells 515 may determine a transmit beamforming weight (and/or a beamforming pattern), to optimize transmission of a synchronization signal to UE 505. In some implementations, small cell 515 may use the receiver beamforming weights calculated during reception of the polling signal from UE 505. That is, the synchronization signals may be optimally beamformed for each UE 505, in such a scenario.

As another example, when transmitting the synchronization signal, small cell 515 may select a predefined beam pattern (e.g., by coordinating with one or more other small cells 515 in a small cell cluster). In this scenario, the same synchronization signal may be able to be shared by multiple UEs 505, thus reducing the overhead associated with providing synchronization signals. While two examples of determining a transmit beamforming weight (or pattern) are described here, in practice, both examples may be used, and/or another technique may be used in conjunction with one or both of these examples, depending on various operating conditions (e.g., the quantity of UEs 505 connected to base station 510, the quantity of UEs 505 connected to one or more small cells 515, and/or whether UE 505 is connected to small cell 515).

Process 600 may additionally include receiving (at 620) a synchronization signal from one or more small cells. The synchronization signal may include one or more synchronization sequences, which UE 505 may use to acquire timing, frequency, and/or cell identifier information associated with a particular small cell 515 that transmits the synchronization signal.

Process 600 may also include selecting and attaching (at 625) to a particular small cell, from which the synchronization signal was received. For example, UE 505 may select a particular small cell 515 based on one or more factors, such as signal strength of the synchronization signal from small cell 515, distance from small cell 515, and/or one or more other factors. UE 505 may perform an attachment procedure with the particular small cell 515, and may subsequently conduct communications (e.g., send and/or receive data, voice traffic, etc.) with small cell 515.

Figure 7:
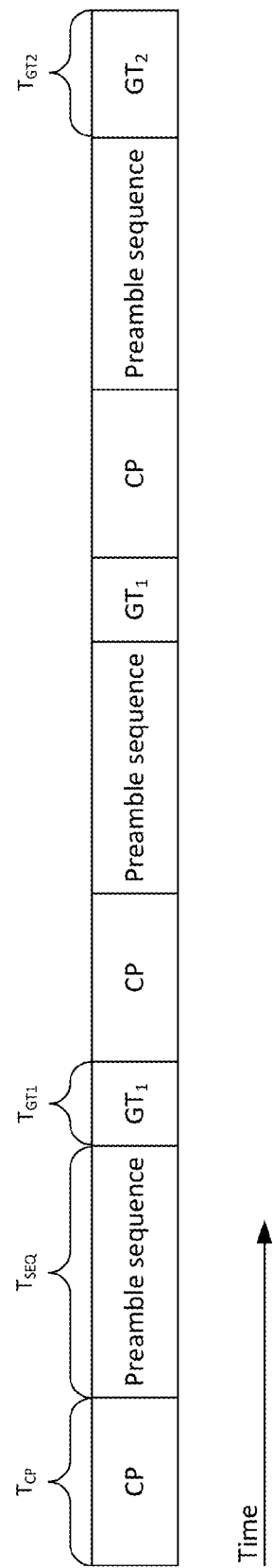
FIG. 7 illustrates an example polling channel format, which may be used by a UE when polling for small cells, in accordance with some implementations described herein.

FIG. 7 illustrates an example polling channel format (e.g., as mentioned above with respect to block 615). For instance, as shown, a polling format may include a CP, a preamble sequence, and a guard time ("GT"). The duration of the CP may be represented as $T_{CP}$, the duration of the preamble sequence may be represented as $T_{SEQ}$, and the duration of the GT may be represented as $T_{GT}$. As shown, multiple preamble sequences (either the same preamble sequence or different preamble sequences) associated with different antenna patterns may be concatenated, and a particular preamble sequence may be separated from a subsequent CP by a GT. One GT ("$GT_1$") may be used between concatenated preamble sequences, and a different GT ("$GT_2$") may be used at the end of the concatenated preamble sequences. The duration of GT1 ("$T_{GT1}$") may be different from the duration of GT2 ("$T_{GT2}$"). For example, $T_{GT1}$, which may provide a time budget for changing the antenna pattern, may, in some implementations, be much shorter than $T_{GT2}$. In some implementations, $T_{GT1}$ and/or $T_{GT2}$ may be different, based on the source of assistance information (e.g., an HFB RAT or an LFB RAT). In some implementations, $T_{GT2}$ may be determined on a per-UE and/or a per-cell basis, and may be derived from a maximum round trip delay between UE 505 and a particular small cell 515, a delay spread for UE 505, and/or a maximum timing estimation error value. The timing estimation error value may be based on, for example, an aggregated timing error during operation in the LFB RAT, an aggregated timing error during operation in the HFB RAT, and/or a relative timing offset between the LFB RAT and HFB RAT.

In general the format of the UE polling channel may be determined on one or more of the following factors: low latency and low UE power consumption in system detection, high detection probability at low signal to noise ratio ("SNR") without UE transmit antenna spatial synchronization, one-way propagation delay estimation under an uplink coordinated multipoint ("CoMP") joint reception scenario, support for high speed UEs, and/or intra-cell or inter-cell interference between different preambles received in the same polling radio resource. In some implementations, the polling format may be determined based on one or more factors in addition to, or in lieu of, the factors enumerated above.

Figure 8:
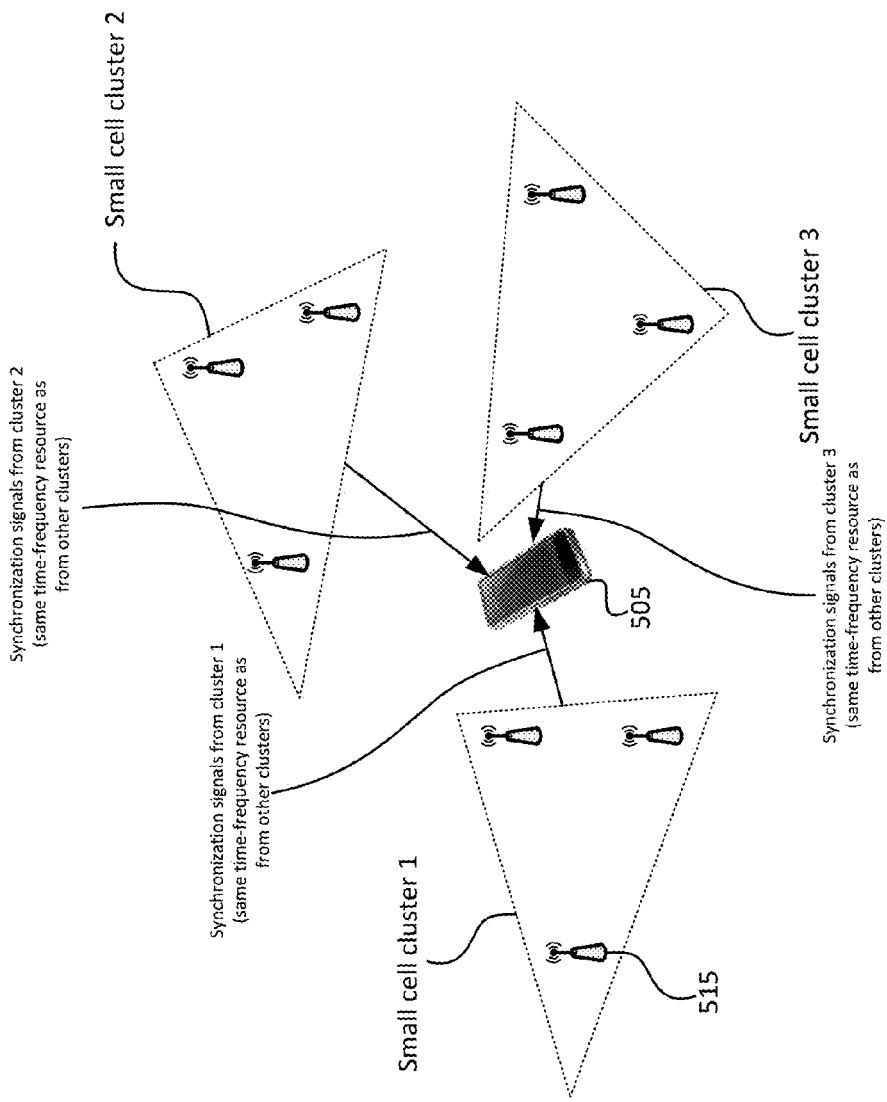
FIG. 8 illustrates the efficient use of time-frequency resources by clusters of small cells and/or transmission points, in accordance with some implementations described herein.

FIG. 8 illustrates an example of clusters of small cells 515 transmitting synchronization signals to UE 505. Each cluster may correspond to small cells 515 that are roughly co-located (e.g., within a particular geographic region) and that may be connected to each other with extremely low latency backhauls, sometimes called "ideal backhauls" (e.g., having a one-way latency less than 2.5 microseconds). Due to the geographically separated deployment of the different small cell clusters, each small cell cluster may transmit a UE-specific synchronization signal that has a distinctive optimal beam direction. That is, for example, the direction of the beams from small cell cluster 1 may be distinct from the direction of the beams from small cell cluster 2. Thus, when sending synchronization signals, small cells 515 of one cluster may use the same time-frequency resources as the small cells 515 of another cluster, since UE 505 can distinguish the different small cells 515 (or small cell clusters) based on the spatial domain in which the synchronization signals were sent.

Additionally, or alternatively, in some implementations, a unique sequence may be mapped to each small cell cluster for a particular UE-specific synchronization signal. Thus, UE 505 may distinguish the different small cells 515 (or small cells cluster) based in a code domain, based on the unique sequences. In some implementations, the unique sequence, associated with a particular small cell 515 and/or small cell cluster, may be included in assistance information provided to UE 505.

Figure 9:
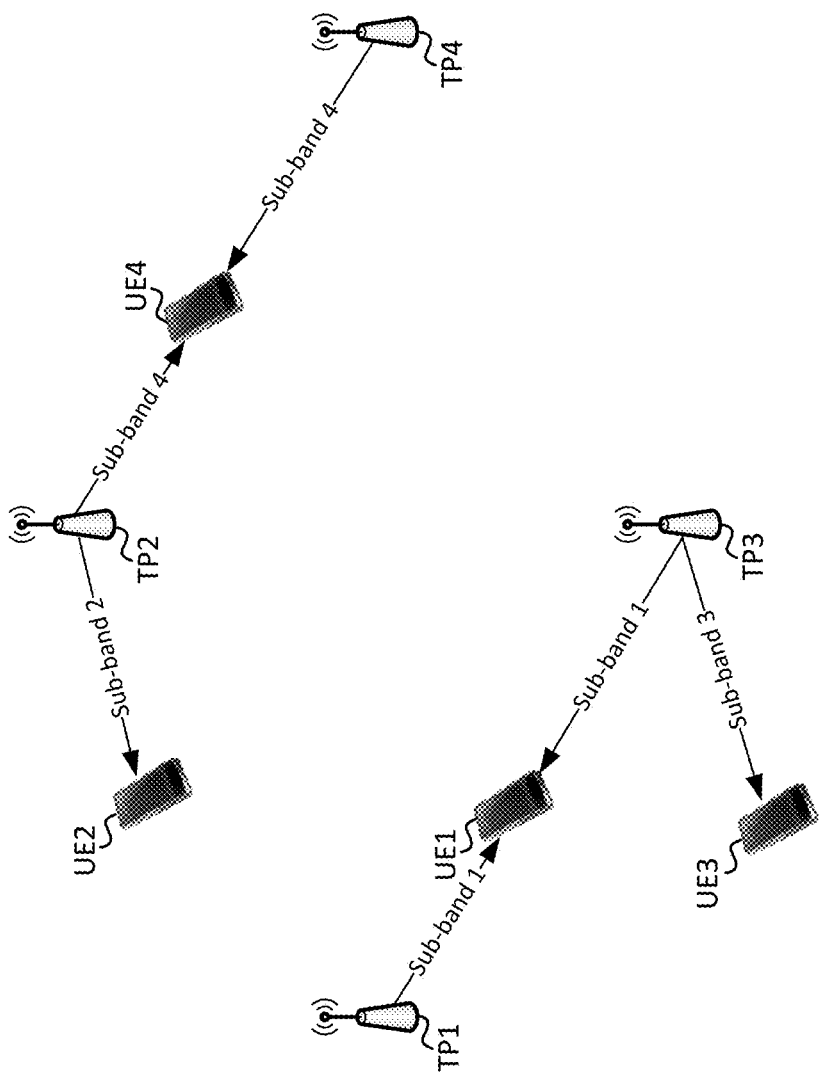
FIG. 9 illustrates frequency division multiplexing ("FDM"), which may be used to efficiently utilize time-frequency resources when providing synchronization signals to UEs, in accordance with some implementations described herein.

FIG. 9 illustrates an example of FDM, which may be a time-frequency resource-efficient technique for outputting synchronization signals to UEs 505. As shown in FIG. 9, several UEs 505 (shown as "UE1" through "UE4") may receive synchronization signals from multiple transmission points ("TPs," shown as "TP1" through "TP4"). Each TP may be a TP of a particular small cell 515 (e.g., in a scenario where small cell 515 includes multiple TPs), or may correspond to a single small cell 515. In some implementations, all TPs shown in FIG. 9 may be from one small cell cluster in FIG. 8, such that all TPs are located within a particular geographic region and connected to each other with extremely low latency backhauls. The synchronization signals may be sent using a CoMP transmission scheme, such as a joint transmission scheme, a coordinated beamforming scheme, etc. For example, a synchronization signal for UE1 may be transmitted from TP1 and TP3, in a fashion of coordinated beamforming.

As shown, time-frequency resources may be utilized in a UE-specific manner. For instance, UE1 may receive synchronization signals on a first sub-band of a frequency band ("Sub-band 1"), UE2 may receive synchronization signals on a second sub-band ("Sub-band 2"), and so on. It is expected that spatial and multi-user diversity orders within one small cell cluster are less than ones among different small cell clusters. Thus, orthogonal time-frequency resource allocation among different UEs may be desired for reliable detection of synchronization signals.

In analog-digital hybrid beamforming, analog beamforming weights may be applied to an entire frequency band. Hence, FDM of multiple UE-specific synchronization signals within one OFDM symbol is limited, if multiple synchronization signals are transmitted from one set of antennas at a particular TP. In this scenario, only synchronization signals with the same analog beamforming weights can be frequency multiplexed on the same OFDM symbol.

To allow flexible FDM of multiple UE-specific synchronization signals, multiple TPs within a small cell cluster may coordinate, such that multiple UE-specific synchronization signals scheduled on the same OFDM symbol but associated with different optimal analog beamforming weights are transmitted from either different TPs or different sets of antennas of the same TP. For example, synchronization signals of UE1 and UE2 associated with different analog beamforming weights are frequency multiplexed in one OFDM symbol, by TP1 transmitting to UE1 and TP2 transmitting to UE2. FDM of UE2 and UE4 is done, by TP2 using two sets of antennas, one set for UE2 and the other set for UE4. In some implementations, the UEs 505 may be signaled beforehand (e.g., in assistance information) as to which sub-band is associated with particular UEs 505. In this manner, synchronization signals may be sent to multiple UEs 505 with different transmit analog beamforming weights within one OFDM symbol, via multiple TPs.

Figure 10:
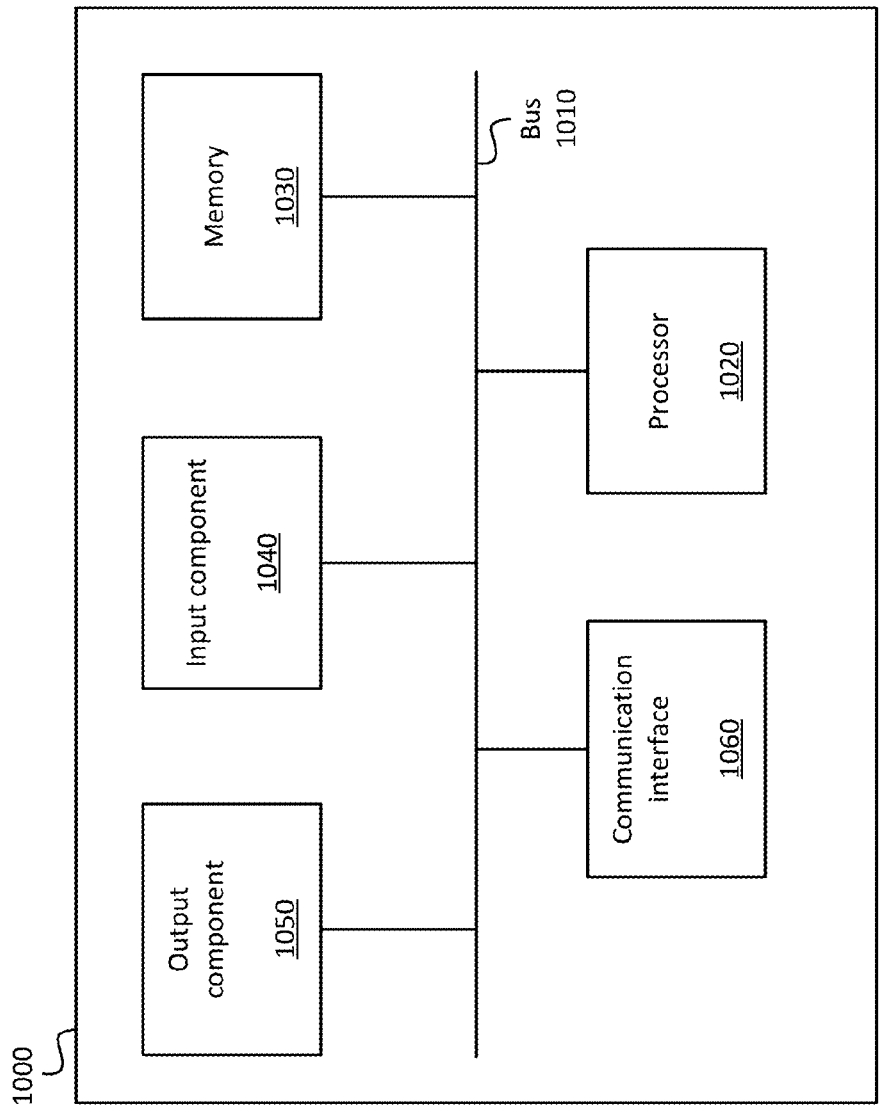
FIG. 10 is a diagram of example components of a device.

FIG. 10 is a diagram of example components of a device 1000. Some of the devices illustrated in FIGS. 1 and/or 2 may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include processing circuitry, such as a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a Bluetooth® radio, a WiFi radio, a cellular radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to FIG. 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit ("ASIC") or a field programmable gate array ("FPGA"), or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. User equipment ("UE") apparatus, comprising:
a radio component to connect to a wireless telecommunications network;
a memory device storing a set of processor-executable instructions; and
processing circuitry to execute the set of processor-executable instructions, wherein executing the set of processor-executable instructions causes the UE to:
receive assistance information that includes at least one of:
a carrier frequency and one or more cell identifiers associated with the wireless telecommunications network,
a polling channel configuration, or
a polling response channel configuration;
generate, based on the assistance information, a polling signal;
output, to a cell device, the generated polling signal via the radio component, wherein the cell device is configured to:
generate a synchronization signal for the UE, the generating including determining one or more beamforming weights based on the polling signal outputted by the UE,
determine one or more transmission points from which to output the synchronization signal via a polling response channel, the determining being based on at least one of:
a signal strength of the received polling signal,
a signal power at which the received polling signal was transmitted by the UE,
a receive timing offset of the received polling signal, or
a load condition of the wireless telecommunications network;
receive the synchronization signal in response to the polling signal, the synchronization signal being received via the radio component and from the determined one or more transmission points; and
detect a particular cell, of one or more cells of the wireless telecommunications network, using the received synchronization signal.

2. The UE of claim 1, wherein the assistance information includes the carrier frequency associated with the wireless telecommunications network,
wherein outputting the polling signal includes outputting the polling signal based on the carrier frequency.

3. The UE of claim 1, wherein the assistance information includes the polling channel configuration, wherein outputting the polling signal includes outputting the polling signal according to the polling channel configuration.

4. The UE of claim 1, wherein the assistance information further includes an indication of a time-frequency resource allocation for the synchronization signal.

5. The UE of claim 1, wherein executing the set of processor-executable instructions causes the UE to:
determine, based on a radio access technology via which the assistance information was received, one or more parameters associated with the polling signal.

6. The UE of claim 5, wherein the one or more parameters, determined based on the radio access technology via which the assistance information was received, include at least one of:
a guard time duration associated with the polling signal, or
a cyclic prefix duration associated with the polling signal.

7. The UE of claim 1, wherein the assistance information includes spatial information, wherein outputting the polling signal includes beamforming the polling signal based on the spatial information.

8. The UE of claim 1, wherein a transmit timing of the polling signal is determined by applying a timing advance based on a timing of another wireless communication system, the timing advance being determined based on a value provided by the other wireless communication system.

9. The UE of claim 1, wherein a set of transmit beamforming weights, associated with the received synchronization signal, are based on a set of receive beamforming weights associated with the polling signal.

10. The UE of claim 1, wherein the polling channel configuration comprises at least one of:
a selected polling channel format,
a time-frequency resource allocation,
an initial transmit power, or
parameters for transmit power control, the parameters for transmit power control comprising at least one of:
an initial transmit power,
an amount of power ramping,
parameters related to set a configured maximum output power, or
a required number of transmissions before transmitting with the maximum configured output power.

11. The UE of claim 1, wherein executing the processor-executable instructions further causes the UE to:
sequentially transmit multiple polling sequences using a plurality of different antenna patterns, wherein a first polling sequence is separated from a second polling sequence by a guard time.

12. The UE of claim 1, wherein the assistance information further includes a cell identifier of the cell device.

13. A cell device of a wireless telecommunications network, the cell device comprising:
a radio component to communicate with a user equipment ("UE");
a memory device storing a set of processor-executable instructions; and
processing circuitry to execute the set of processor-executable instructions, wherein executing the set of processor-executable instructions causes the cell device to:
output, to the UE, assistance information that includes at least one of:
a carrier frequency associated with the wireless telecommunications network,
a polling channel configuration, or
a polling response channel configuration;
receive, from the UE, a polling signal that was generated by the UE based on the assistance information;
generate a synchronization signal for the UE, the generating including:
determining one or more beamforming weights based on the received polling signal;
determine one or more transmission points from which to output the synchronization signal via a polling response channel, the determining being based on at least one of:
a signal strength of the received polling signal,
a signal power at which the received polling signal was transmitted by the UE,
a receive timing offset of the received polling signal, or
a load condition of the wireless telecommunications network; and
output the generated synchronization signal via the polling response channel, via the one determined one or more transmission points, to the UE, in response to the polling signal, the polling response channel corresponding to the polling response channel configuration.

14. The cell device of claim 13, wherein the cell device operates at a higher frequency band than a frequency band at which a Long-Term Evolution ("LTE") base station network operates,
wherein the cell device is synchronized with one or more LTE base stations.

15. The cell device of claim 13, wherein assistance information includes the carrier frequency associated with the wireless telecommunications network,
wherein the polling signal is received at the carrier frequency associated with the wireless telecommunications network.

16. The cell device of claim 13, wherein the assistance information further includes a cell identifier of the cell device.

17. The cell device of claim 13, wherein the one or more beamforming weights are determined based on at least one of:
a beamforming weight associated with the received polling signal, or
a set of beamforming weights.

18. A method, comprising:
receiving, by a wireless telecommunications network, a polling signal from a user equipment ("UE"); and
outputting, from a plurality of transmission points of the wireless telecommunications network, a plurality of synchronization signals to a plurality of UEs,
wherein a first synchronization signal for a first UE, from a first transmission point, is associated with a first set of beamforming weights,
wherein a second synchronization signal for the first UE, from a second transmission point, is associated with a second set of beamforming weights that is different from the first set of beamforming weights,
wherein the first and second synchronization signals for the first UE are transmitted on a same time-frequency resource,
wherein outputting the plurality of synchronization signals includes:
multiplexing the plurality of synchronization signals associated with different analog beamforming weights on a frequency domain, the synchronization signals for the first UE, associated with a first set of analog beamforming weights, being outputted from a particular transmission point on a first frequency sub-domain, and
the synchronization signals for a second UE, associated with a second set of analog beamforming weights, being outputted from another transmission point on a second frequency sub-domain, the first and second frequency sub-domains being different.

19. The method of claim 18, wherein the transmission points operate at a higher frequency band than a frequency band at which a Long-Term Evolution base station operates.

20. The method of claim 18, wherein the first and second synchronization signals are output simultaneously by the first and second transmission points, respectively.

* * * * *